United States Patent [19]
Mayer et al.

[11] Patent Number: 5,223,797
[45] Date of Patent: Jun. 29, 1993

[54] ROTATABLE CAPACITANCE SENSOR

[75] Inventors: Daniel W. Mayer, St. Paul, Minn.; Roger C. Oestreich, River Falls, Wis.

[73] Assignee: Modern Controls, Inc., Minneapolis, Minn.

[21] Appl. No.: 955,643

[22] Filed: Oct. 2, 1992

Related U.S. Application Data

[63] Continuation-in-part of Ser. No. 764,774, Sep. 24, 1991.

[51] Int. Cl.$^5$ .............................................. G01N 27/12
[52] U.S. Cl. .................................. 324/688; 324/699; 324/701; 324/687; 73/159
[58] Field of Search ................... 73/159, 160; 324/688, 324/695, 699, 687, 701

[56] References Cited
U.S. PATENT DOCUMENTS

| | | | |
|---|---|---|---|
| 2,653,298 | 9/1953 | McKinley | 324/695 |
| 3,384,815 | 5/1968 | Lyall | 324/695 |
| 3,535,631 | 10/1970 | DeGeest | 324/701 |
| 3,657,645 | 4/1972 | Van Nueten | 324/699 |
| 4,027,238 | 5/1977 | Loch | 324/695 |
| 4,568,874 | 2/1986 | Kramer | 324/688 |
| 4,968,947 | 11/1990 | Thorn | 324/701 |

Primary Examiner—Kenneth A. Wieder
Assistant Examiner—Jose M. Solis
Attorney, Agent, or Firm—Palmatier, Sjoquist & Helget

[57] ABSTRACT

A rotatable capacitance sensor for detecting film thickness of a moving film web, the rotatable sensor having a capacitive element arranged to contact the moving web film, the capacitive element electrically connected to projecting shaft ends of the rotatable sensor, resilient conductors urged against the respective shaft ends, and an electrical shield overlaying the resilient conductors and the rotatable shaft, to electrically isolate shaft wobble from the surrounding housing.

10 Claims, 6 Drawing Sheets

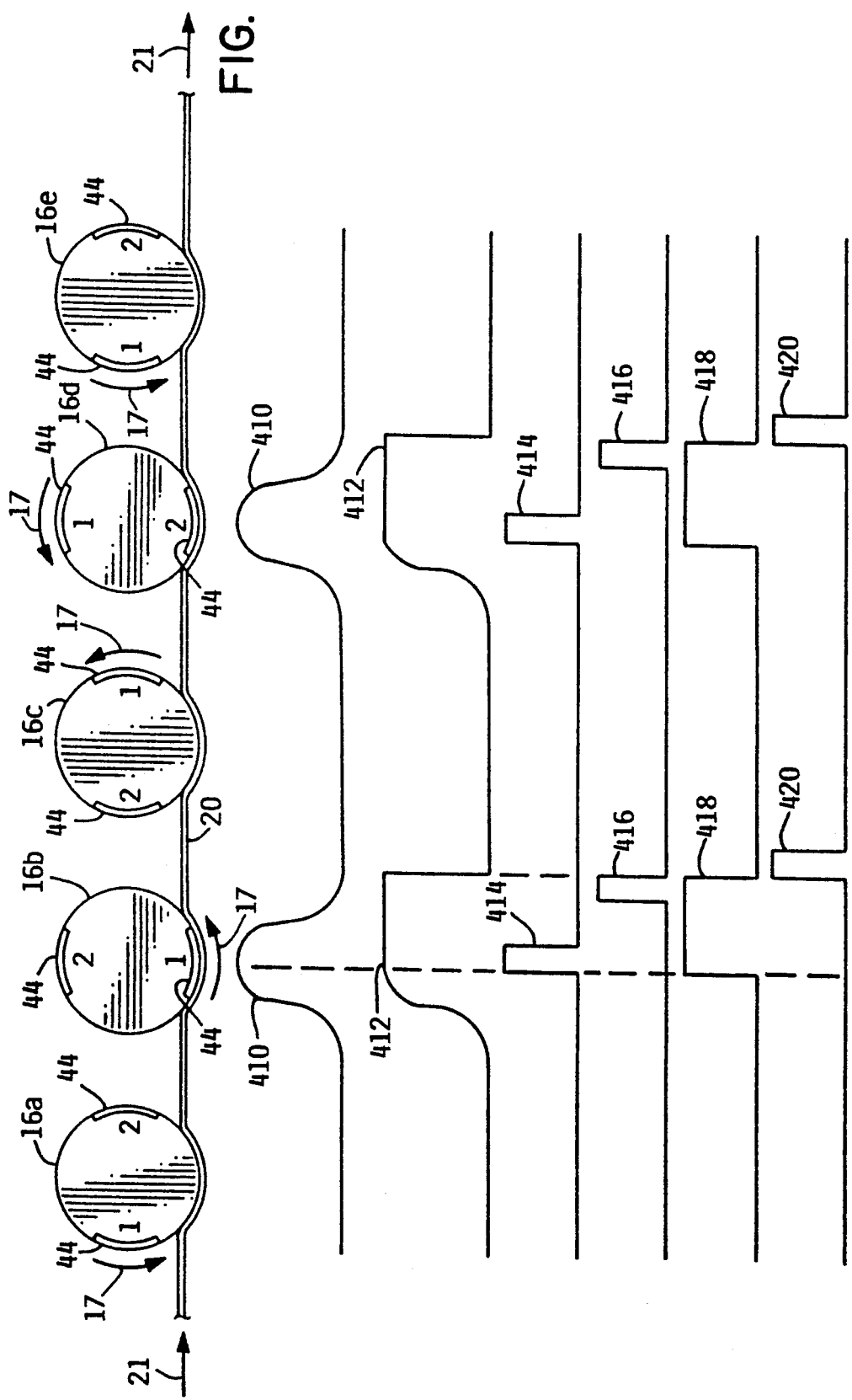

ROTATABLE CAPACITANCE SENSOR

This is a continuation-in-part of U.S. patent application Ser. No. 07/764,774, filed Sep. 24, 1991.

BACKGROUND OF THE INVENTION

The present invention relates to an apparatus for measuring the thickness of moving films; more particularly, the invention relates to a rotatable sensor which makes rotatable contact with a moving sheet of thin material. The most notable application of the invention is in connection with measuring thickness of thin plastic film in sheet form, of the type typically manufactured in blown film machines.

Most prior art thickness gauges used in connection with blown film machines utilize contact devices; i.e., a sensor is brought into contact with a moving sheet of plastic film and film thickness measurements are made as the film passes the sensor head. Some of these devices are transversely movable across or around a blown film bubble so as to traverse the entire circumferential surface area of the film bubble. In other cases, the sensor head is mounted in a fixed position and the bubble itself rotates transversely at a slow turning rate at the same time as the film moves longitudinally past the head.

Some prior art film thickness measuring devices do not actually contact the film, but these devices generally suffer from the disadvantage of poor accuracy, and such devices are generally unable to make accurate measurements of thickness, particularly of very thin films.

Examples of prior art film thickness measuring devices are found in prior patents. U.S. Pat. No. 3,764,899, issued Oct. 9, 1973, discloses an electrode assembly which is mounted in a fixed position, and a thin plastic film strip is movably passed across a sensing head to obtain measurements of film thickness in conjunction with an electronic circuit for processing the capacitance signals produced thereby. U.S. Pat. No. 4,947,131, issued Aug. 7, 1990, discloses a capacitance bar sensor designed to be placed in contacting relationship with a moving film surface, to provide extremely accurate film thickness measurements independent of temperature variations. U.S. Pat. No. 3,300,716, issued Jan. 4, 1967, discloses a capacitance sensing apparatus for measuring transversely across a sheet of moving film, particularly disclosing electronic circuits for enhancing the signal processing. Various circuits for processing signals from a capacitance sensor of the type disclosed herein are well known from the foregoing and other prior art patents, and such circuits are not specifically dealt with in the present disclosure.

One of the problems with prior art contact sensors is that, because such sensors inherently must remain in contact with a moving film, they tend to mark or scratch the film surface. Such sensors may be designed to minimize this problem, but in particular film applications such as high-quality optical films, even fine hairline scratches on the film may be cause for concern. Because of the relative differences in velocity between the sensor and the film, the problem of film scratching is always present with sensors of this type.

SUMMARY OF THE INVENTION

The present invention relates to a rotatable sensor for capacitively measuring the thickness of a moving plastic film, wherein the axis of rotation of the sensor assembly is transverse to the direction of movement of the film. A sensor head is placed in contacting relation to the film and the head is rotatable by virtue of this contacting relationship, to produce a rate of travel of the head which is synchronized to the rate of travel of the film sheet. The capacitive sensing element of the sensor head is made from a plurality of conductive sheets which are interleaved with insulator strips, to produce rotatable capacitance plates embedded in the rotatable head assembly. The head assembly is mounted to a fixed or movable carriage by bearing assemblies which incorporate rotary contacts for conveying the capacitance electrical signals to an appropriate circuit or circuits for processing the signals. A capacitance shield covers the rotary contact to isolate the effect of shaft wobble, which could otherwise create a capacitive error signal. The carriage may be mounted to a transport mechanism for transporting the entire head assembly relative to the film surface.

It is a principal object and advantage of the present invention to provide a capacitance thickness measuring device for contacting a moving plastic film to obtain film thickness measurements.

It is another object of the present invention to provide a film thickness measuring device which contacts a film surface without scratching or otherwise damaging the film surface.

It is a further advantage and object of the present invention to provide a film thickness measuring device which provides highly accurate thickness measurements through rotatable contact with a moving film in speed synchronization with the film.

Other and further objects and advantages of the invention will become apparent from the following specification and claims, and with reference to the appended drawings.

BRIEF DESCRIPTION OF THE DRAWINGS

FIG. 13A shows several rotational positions of the sensor; and

FIG. 13B shows the electrical signal relationships which are produced from the sensor position of FIG. 13A.

DESCRIPTION OF THE PREFERRED EMBODIMENT

Figure 1:
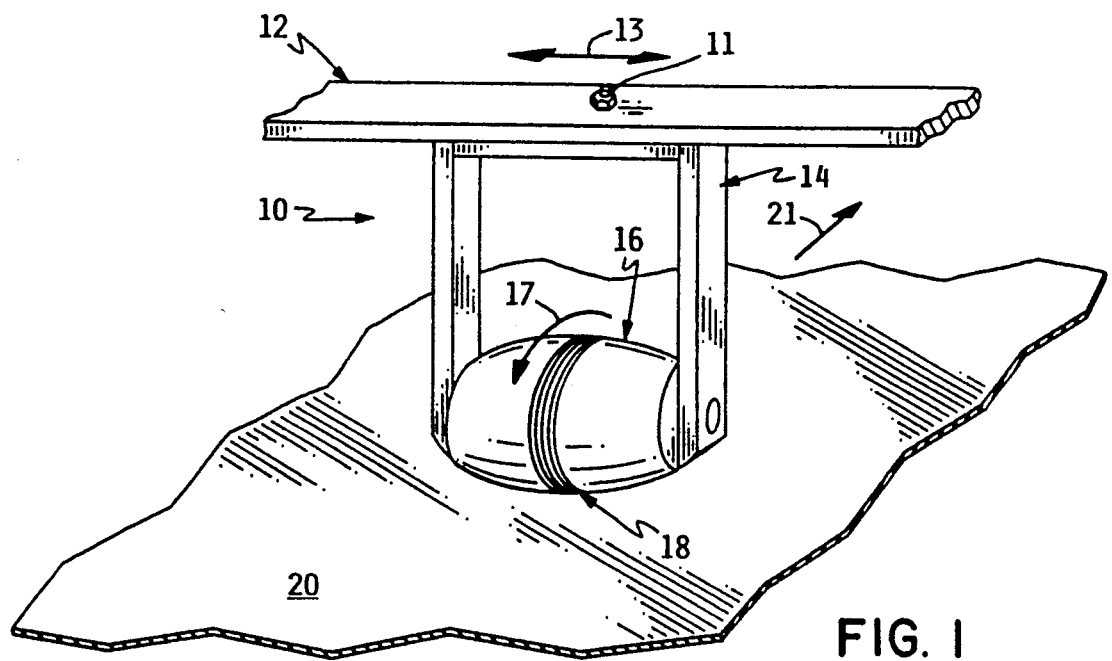
FIG. 1 shows an isometric view of one form of the invention.

FIG. 1 shows an isometric view of one form of the invention. A capacitance sensing assembly 10 is attached to a transport mechanism 12 by means of a pivotal connector 11. The transport mechanism 12 may allow for transverse movement of the sensing assembly 10 in the directions indicated by arrow 13. A carriage 14 may be affixed to transport mechanism 12, carriage 14 holding a rotatably-mounted sensor 16. The sensor 16 is positioned in contacting proximity to a movable plastic film sheet 20, the film sheet 20 being movable in the direction shown by arrow 21. The contacting relationship of sensor 16 with sheet 20 causes rotation of sensor 16 in the direction indicated by arrow 17. Sensor 16 incorporates a sensor head 18 which will be described in more detail hereinafter.

Figure 2:
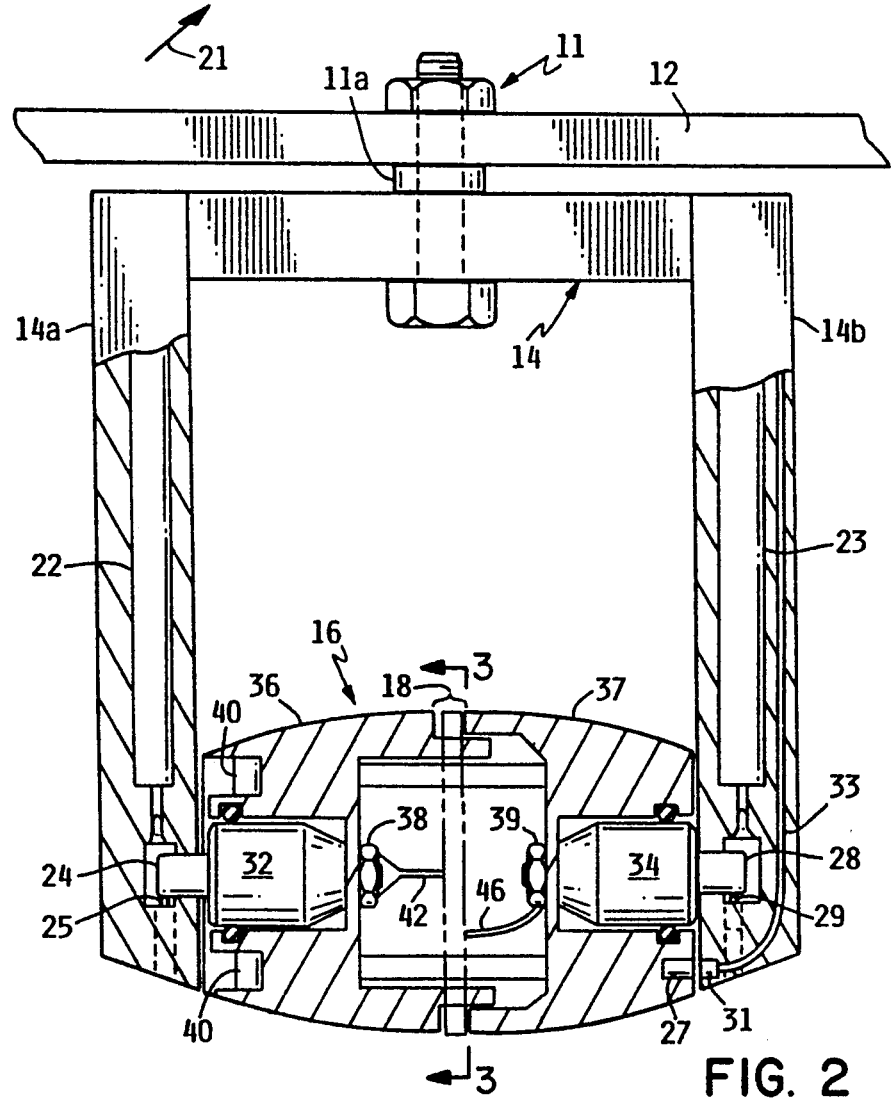
FIG. 2 shows the device of FIG. 1 in partial cross section.

FIG. 2 shows a partial cross-sectional view of the device of FIG. 1. Carriage 14 comprises a pair of legs 14a and 14b which are preferably made from a nonconductive material such as a plastic material which is sold under the trademark "Delrin." Carriage 14 may be pivotally connected to transport mechanism 12 by means of a pivotal connector 11 in such case, a bearing 11a is preferably positioned to permit relative rotation of carriage 14 with respect to transport mechanism 12. Pivot connector 11 enables carriage 14 to automatically align itself with the longitudinal movement of film sheet 20. Legs 14a and 14b each have respective passages and cavities to pass conductors therethrough, and to affix the ends of shafts which are coupled to sensor 16. A first conductor 22 passes through a passage in leg 14a, conductor 22 being referred to herein as a "positive" conductor, which is electrically connected to a rotary contactor 32. Shaft end cap 24 is mechanically affixed to leg 14a by means of a set screw 25. Similarly, a "negative" conductor 23 passes through leg 14b and is electrically connected to a rotary contactor 34, and end cap 28 is mechanically affixed to leg 14b by a set screw 29. End caps 24 and 28 respectively form a part of a rotary contactor 32 and 34. Rotary contactors 32 and 34 are commercially available devices which provide sealed mercury rotary contacts to a rotating mechanism, such as a device which is sold under the trade designation "Rotocon-M1," by Meridian Laboratory of Middleton, Wis. The particular advantage of this device is that it enables a reliable electrical connection to be made between a rotating member and a fixed member, through the use of sealed mercury rotary contacts. In the particular application described herein, end caps 24 and 28 are fixed members and rotary contactors 32 and 34 are rotatable members affixed inside of rotatable sensor 16. End caps 24 and 28 form a part of the rotary contact device, enabling electrical connection between rotatable members and the respective conductors 22 and 23.

A magnet 27 may be embedded into one of the housings 36, 37 to rotate therewith. A magnetic pickup 31 is correspondingly positioned in the adjacent leg 14a, 14b, to detect the rotational movement of magnet 27. An electrical signal will be generated in magnetic pickup 31 which may be passed to a sensor external to the device via wire 33. This mechanism permits the rotational position of sensor 16 to be identified; more specifically, it enables the specific capacitive elements within sensor 16 to become uniquely identified. Magnet 27 and magnetic pickup 31 therefore provide an indexing of the rotational position of sensor 16. If a plurality of capacitive elements are designed into sensor 16, this indexing scheme enables each capacitive element to be uniquely identified. To the extent that different capacitive elements and sensor 16 produce different capacitive signals, the indexing scheme enables the different signals to be electronically averaged or balanced, or otherwise compensated for in external circuitry.

Figure 3:
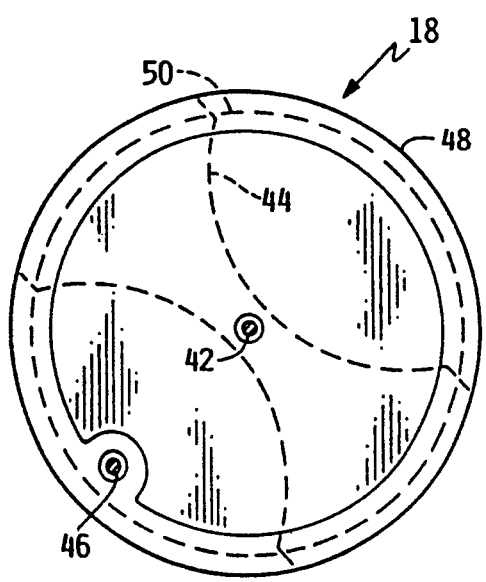
FIG. 3 shows a cross-sectional view taken along the lines 3—3 of FIG. 2.
Figure 4:
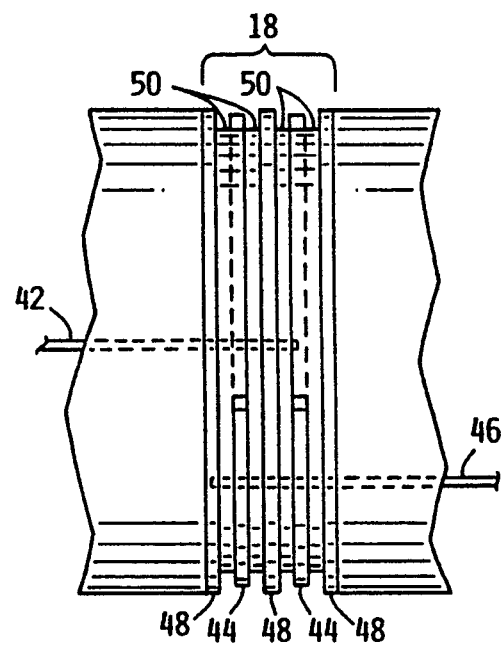
FIG. 4 shows an expanded view of a portion of FIG. 2.

Sensor 16 is formed from two split housings 36 and 37. Housing 36 is affixed to rotary contactor 32 by means of a threaded fastener 38. Split housing 37 is affixed to rotary contactor 34 by means of a threaded fastener 39. The two housing halves 36 and 37 are held together by means of threaded fasteners 40. The sensor head 18 is compressed between the two housing halves 36 and 37 by virtue of the threaded fasteners 40. A central wire 42 projects from the end of rotary contactor 32, and is affixed to the plurality of positive plates which make up sensor head 18 (see FIGS. 3 and 4). These positive plates are designated by the numeral 44, and are electrically connected to positive conductor 22 via wire 42 and rotary contractor 32. A wire 46 connects a plurality of negative plates 48 comprising sensor head 18 to rotary contractor 34. The negative plates 48 are electrically connected to negative conductor 23 via rotary contractor 34. A plurality of dielectric insulator rings 50 are interleaved between positive and negative plates, to electrically insulate respective adjacent plates, and to provide a known dielectric material between the plates. The outer diameter of insulator plates 50 is slightly smaller than the respective outer diameter of positive plates 44 and negative plates 48.

Figure 5:
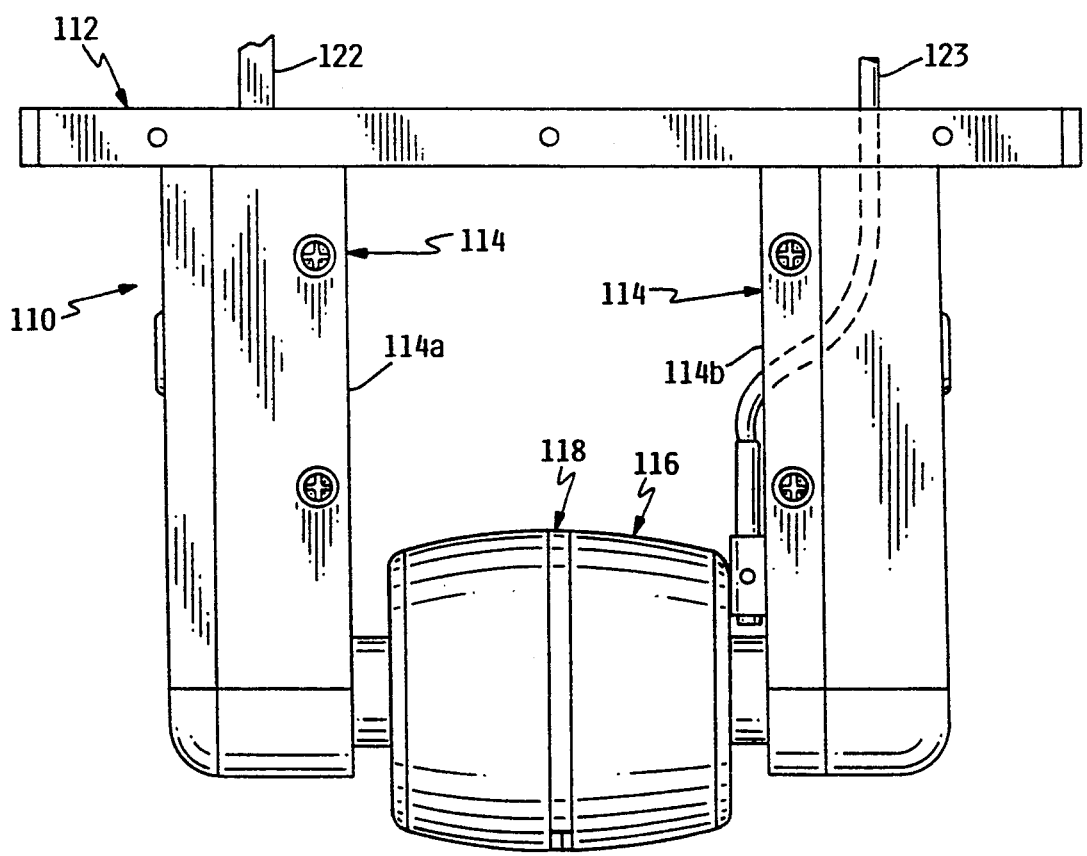
FIG. 5 shows a top view of an alternative form of the invention.

FIG. 5 shows a top view of an alternate embodiment of the invention, which embodiment is preferred for its ability to reduce capacitance error signals caused by slight eccentricities in the rotation of the sensor and its shaft. FIG. 5 shows a transport mechanism 112 which has a carriage 114 attached thereto. Carriage 114 includes legs 114a and 114b, and sensor 116 is rotatably connected between legs 114a and 114b. Sensor 116 has a sensor head 118 which is rotatable with sensor 116. A first conductor 122 and a second conductor 123 are respectively connected to sensor head 118, for providing electrical signals representative of the capacitance changes detected by sensor head 118.

Figure 6:
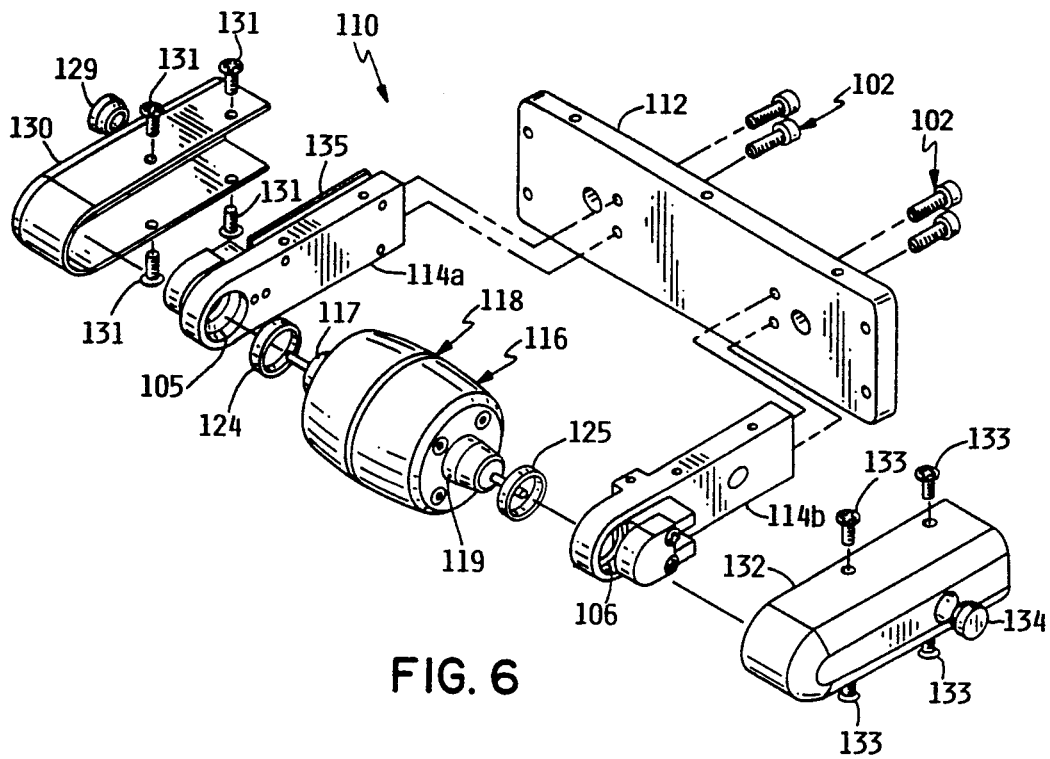
FIG. 6 shows an exploded view of the device of FIG. 5.

FIG. 6 shows sensing assembly 110 of FIG. 5 in exploded view. Carriage legs 114a and 114b are affixed to transport mechanism 112 by fasteners 102. Transport mechanism 112, and carriage legs 114a and 114b are all made from a conductive metal material, which is electrically grounded.

Sensor 116 is rotatably mounted between legs 114a and 114b. A bearing 124 is seated in an opening 105 in leg 114a, and bearing 124 is sized to receive the outside hub 117 of sensor 116. Likewise, bearing 125 is received within an opening 106 in leg 114b, and bearing 125 is sized to receive the outside hub 119 of sensor 116. A cover 130 is affixed to leg 114a by fasteners 131; a cover 132 is affixed to leg 114b by fasteners 133. Cover 130 has an access plug 129 associated therewith; cover 132 has an access plug 134 associated therewith. The respective covers 130 and 132 are electrically grounded by virtue of their fastening to legs 114a and 114b. The conductors associated with leg 114b are considered the "negative" or "ground" side of the system; the conductors associated with leg 114a are considered the "positive" side of the system. A circuit board 135 is affixed to leg 114a, having thereon the necessary electrical components to provide amplification of the detected capacitance signals from sensor 116.

Figure 7:
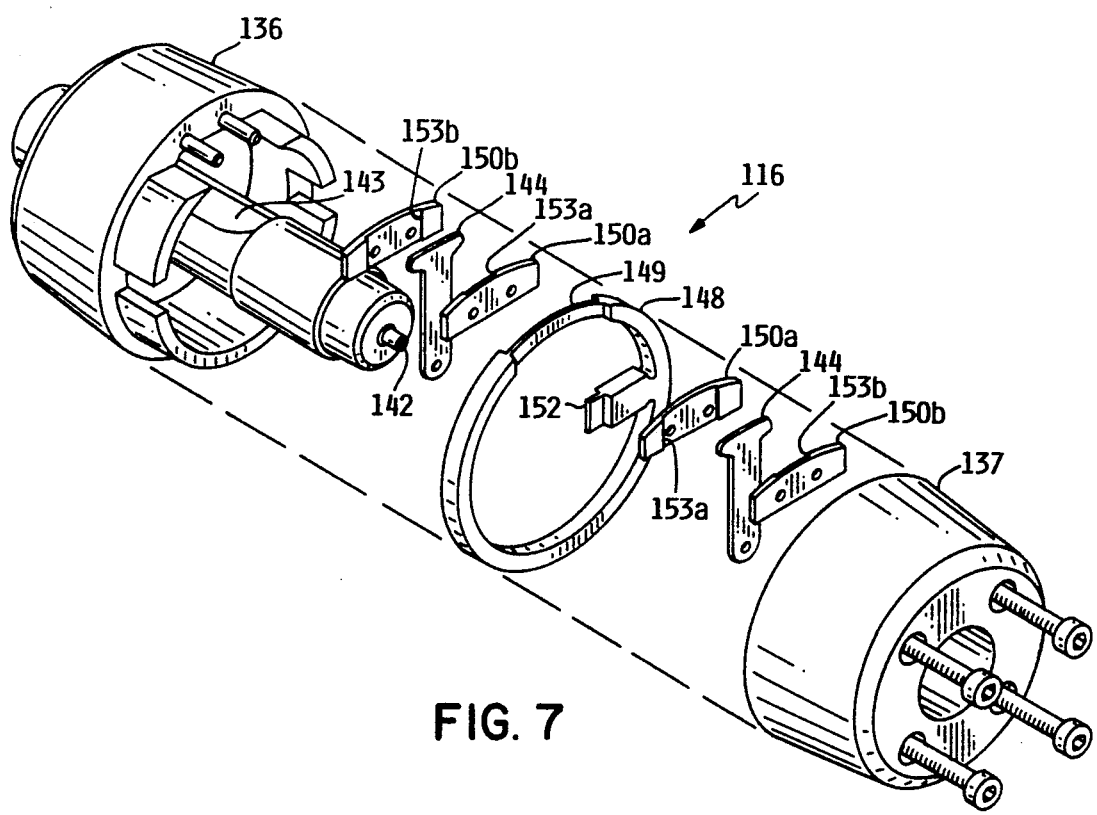
FIG. 7 shows an exploded view of the sensor of FIG. 5.

FIG. 7 shows an exploded view of sensor 116, illustrating the split housing sections 136 and 137. A ground ring 148, typically made from brass, is positioned in the center of the sensor head, having an arcuate range 149 of reduced thickness. A first pair of insulators 150a are each sized to fit into the reduced thickness portion 149 and a pair of conductor plates 144 are sized to fit into slots 153a in the insulators 150a. A second pair of insulators 150b, each with a slot 153b, are fitted against conductor tabs 144, thereby sandwiching conductor pads 144 between respective pairs of insulators 150a, 150b. The insulators 150a, 150b may be made from a plastic material such as Teflon ®, or other similar material.

Figures 9, 10:
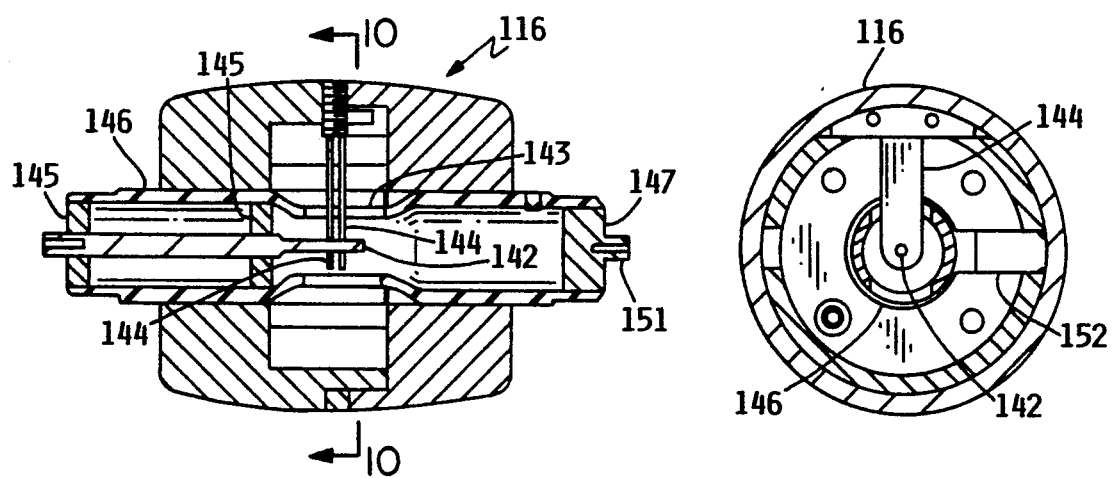
FIG. 9 shows a cross-section view of the sensor of FIG. 7.
FIG. 10 shows a view taken along the lines 10—10 of FIG. 9.

FIG. 9 shows a cross-sectional view of sensor 116 with the respective conductors and insulators sandwiched together. Conductors 144 are electrically affixed to sensor shaft 142 which is made from conductive material. Sensor shaft 142 is axially positioned in sensor 116 by nonconductive spacers 145. One end of shaft 142 projects outwardly beyond the outermost spacer 145. Spacers 145 are confined in conductive tube 146 which extends throughout the axial length of sensor 116. A conductive end cap 147 is press fit into the other end of tube 146, and has a projecting neck 151 extending outwardly therefrom.

FIG. 10 shows a cross-sectional view taken along the lines 10—10 of FIG. 9, showing conductor tabs 144 affixed to shaft 142 as by soldering. The conductor tabs are isolated from direct contact with tube 146 because they extend through opening 143 in tube 146. The ground ring 148 has an internally projecting arm 152 which is soldered to the outside surface of tube 146. As a result thereof, conductive tabs 144 are maintained at the same electrical potential as shaft 142, and ground ring 148 is maintained at the same electrical potential as tube 146.

Figure 8:
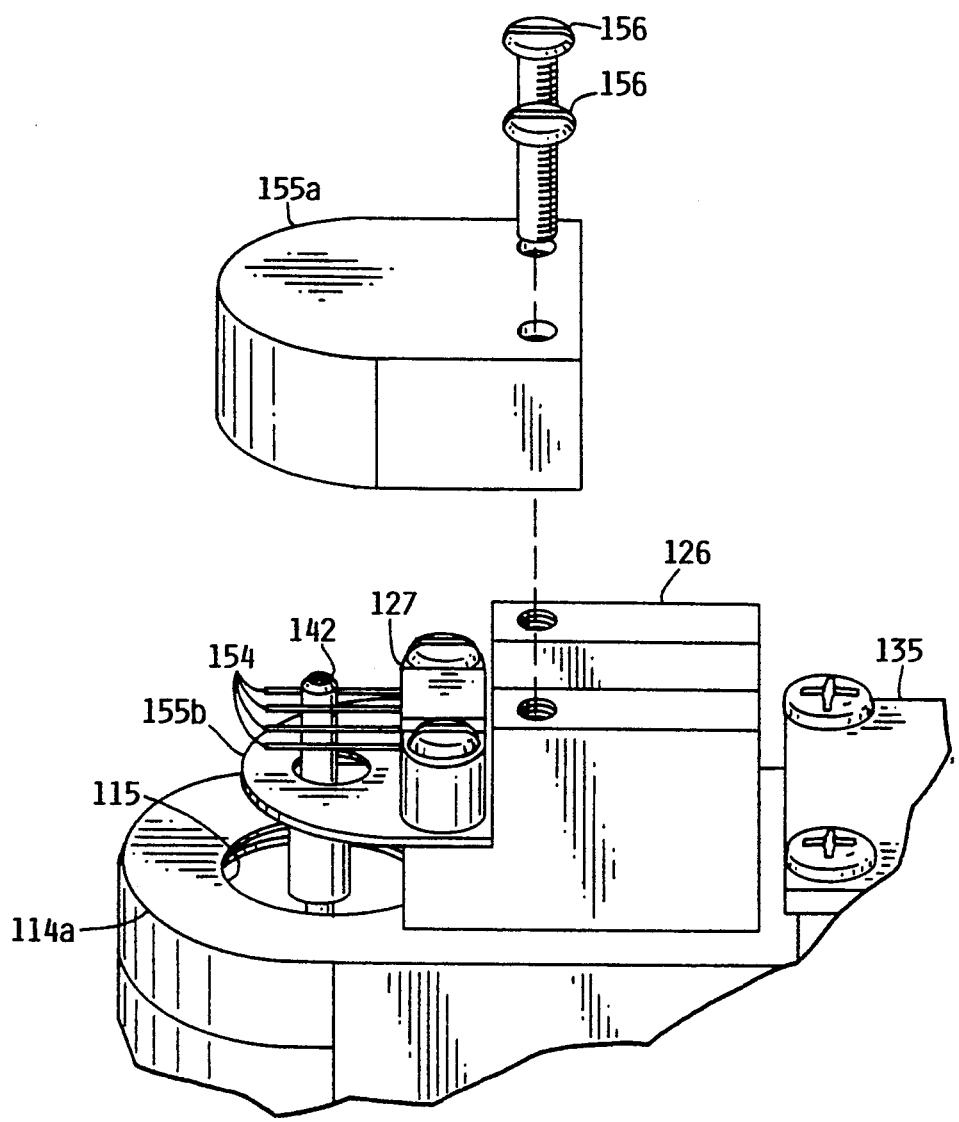
FIG. 8 shows an enlarged view of a portion of the housing.
Figure 12:
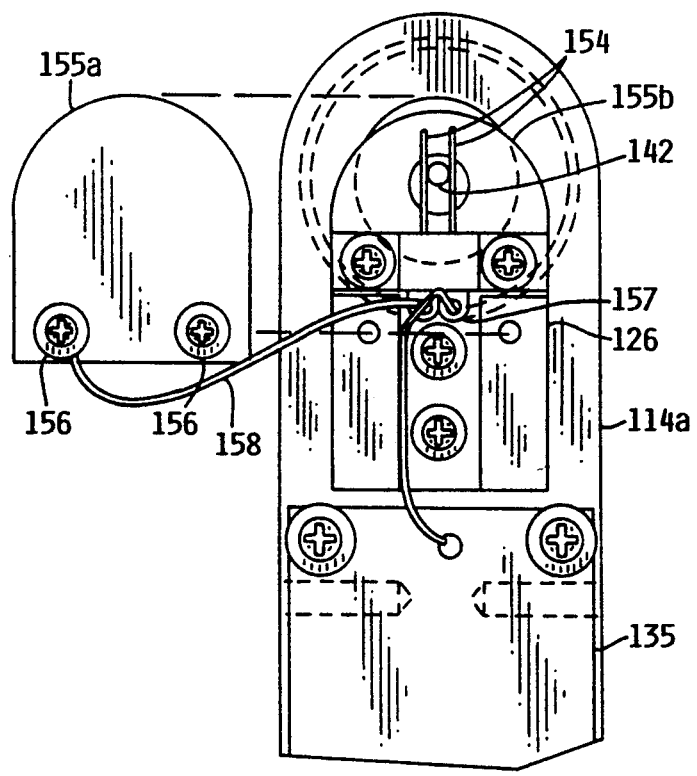
FIG. 12 shows a further end view.

FIG. 8 shows a portion of carriage leg 114a, which has an opening 115 through which rotatable shaft 142 projects. A mounting block 126 is affixed to the outside surface of carriage leg 114a, mounting block 126 being constructed of an insulating material such as Delrin. A terminal block 127 is affixed to mounting block 126. A plurality of conductive wiper pins 154 project from terminal block 127, and pins 154 are arranged to resiliently contact against shaft 142, to provide continuous conductive contact with shaft 142. The electrical circuit board 135 is also affixed to carriage leg 114a, and is mounted on insulated spacers so as to electrically isolate circuit board 135 from the carriage leg 114a. A conductive shield 155a is fitted over the mounting block 126 and affixed thereto by means of fasteners 156. A second conductive shield 155b is affixed to terminal block 127, and has a small opening to permit the end of shaft 142 to pass therethrough. Conductive shields 155a and 155b may be soldered together after assembly, to insure a good electrical contact therebetween. FIG. 12 shows a further view of the same portion of carriage leg 114a, illustrating the electrical connections thereto. The wiper pins 154 are electrically connected to terminal lugs 157, and terminal lugs 157 are wired to circuit board 135. A wire 158 is connected from one of the fasteners 156 to terminal lug 157 to thereby place shield 155a and shield 155b at the same electrical potential as terminal lug 157 and wiper pins 154. The overall purpose of utilizing shields 155a and 155b and the wiring connections illustrated in FIG. 12 is to eliminate noise signals caused by wobble motion of shaft 142. Under realistic operating conditions there is always some measurable shaft wobble in a rotating mechanism, and this wobble produces positional variation of the shaft relative to the metallic materials which are used to construct carriage leg 114a. The positional variations will cause very slight changes in capacitive coupling between the rotating shaft 142 and ground potential, which in some cases is sufficiently large so as to obscure the capacitive signal being picked up by wiper pins 154. The placement of shields 155a and 155b over the entire shaft end of the housing isolates shaft movement from influencing capacitive coupling to nearby grounded objects, because all shaft movement occurs within shields 155a and 155b which are electrically at the same potential as the shaft and the wiper pins. Therefore, the voltage potential of shield 155a and 155b is presented to the surrounding grounded members, but shields 155a and 155b are fixed in position and do not move, and therefore no capacitance change will be detected as a result of shaft wobble.

Figure 11:
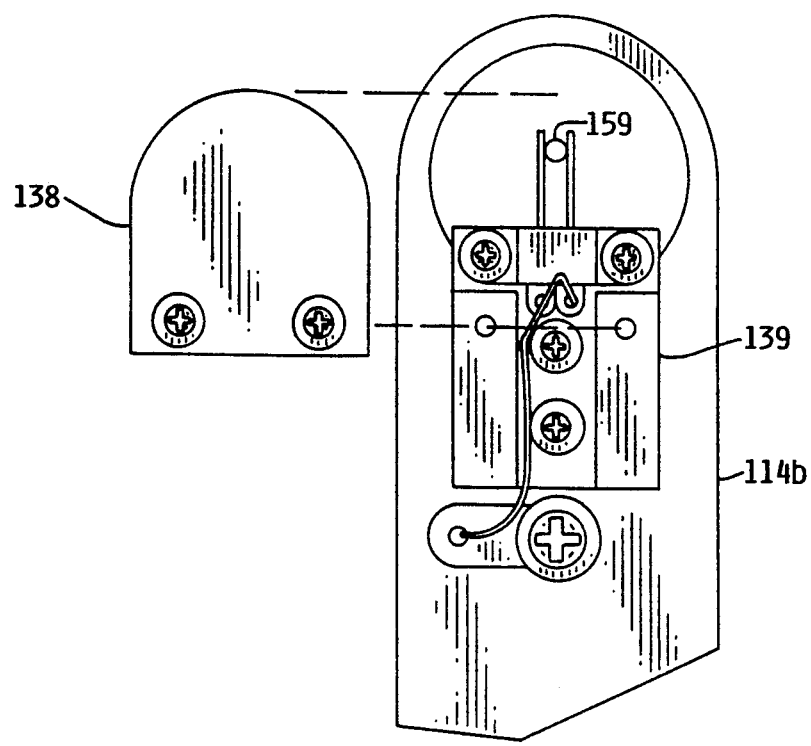
FIG. 11 shows a partial end view of the device of FIG. 6.

A similar shield is placed on carriage leg 114b, as illustrated in FIG. 11, wherein a shield 138 is fastened to a mounting block 139 on carriage leg 114b. In the example of FIG. 11, the wiper pins are resiliently contacting shaft extension 159, which is electrically connected to ground potential, and the shield 138 is also affixed to ground potential.

FIG. 13A shows five different rotary positions (16a–16e) for sensor 16, wherein the positive plate 44 is rotated to a different angular position relative to a plastic sheet 20. The plastic sheet 20 is presumed to be moving in the direction of arrow 21, and the respective representations of sensor 16 will therefore each rotate in the direction of arrow 17. For convenience, the end points of positive electrode 44 have been respectively identified with a "1" and "2". Of course, representations of FIGS. 13A and 13B are equally applicable to sensor 116, except sensor 116 has only a single capacitive electrode around its circumference.

FIG. 13B shows a number of different electrical signals which are generated by the respective sensor positions represented in FIG. 13A, in conjunction with conventional electronic circuits which may be used to develop digital representations of sensor signals for further processing. Each signal event is illustrated in a time sequence which corresponds to the sensor position shown immediately above the signal diagram of FIG. 13B. For example, the leftmost sensor position shown in FIG. 13A (16a) shows that neither positive electrode plate is in contact with the film 20. Therefore, no electrical signal will be generated by the sensor in the position shown. The sensor position shown by 16b places electrode "1" in direct contact with moving film 20, and results in the generation of a voltage signal 410 as illustrated in FIG. 13B. Voltage signal 410 is an analog voltage signal, and the signal may be passed through an analog "peak-and-hold" circuit to produce the signal 412, which is a signal having a fixed and extended amplitude equal to the maximum amplitude of signal 410. The peak amplitude of signal 412 may be used to provide a trigger signal 414, which may be used as the triggering event to initiate a signal 418 to control an analog-to-digital converter circuit (A/D), which will enable the conversion of the peak value of signal 412 into a digital representation for subsequent processing in a digital computer. The time required for the A/D conversion process to occur is represented by signal 418, the trailing edge of which can be controlled by signal 416, to generate a reset signal 420 to initialize the circuitry for reception of the next subsequent signal. The sensor position shown by 16c generates no signal, because the electrodes "1" and "2" are not in contact with film sheet 20. However, the sensor position 16d places electrode "2" in contact with film 20 and generates the sequence of signals shown in FIG. 13B, which are essentially identical to the sequence of signals illustrated with respect to position 16b. The sensor position 16e also generates no further signals because the electrodes are not in contact with the film surface.

The foregoing signal representations may be utilized in driving conventional circuits which are well known in the art, to produce a digital representation of the magnitude of the signals sent by the sensor, which can be readily converted to a value representative of film thickness.

In operation, the rotatable sensor is placed in contacting relationship against a moving film surface, and the contact of the film against the sensor causes the sensor to rotate in coincidence with the film. The rate of film travel and the rotational speed of the sensor are identical, so the sensor cannot impart scratching against the film, which could otherwise occur if there were relative differences in the rate of travel therebetween. In certain embodiments it may be desirable to impart a transverse motion to the overall sensor assembly, while permitting freely-rotatable motion of the sensor relative to the longitudinal travel path of the film. In such embodiments the pivotal movement of the carriage permits transverse movement of the sensor at an angle relative to the film, and minimizes any tendency toward scratching the film surface. The transverse rate of travel of the sensor head is considerably slower than the longitudinal rate of travel of the film, so that one pass of the sensor head across the transverse dimension of the film is accomplished during a fairly long longitudinal passage of film material.

Of course, the sensor head 118 could also be aligned parallel to the sensor 116 axis, to provide a system equivalent to the present invention, as was described in the parent application.

The present invention may be embodied in other specific forms without departing from the spirit or essential attributes thereof, and it is therefore desired that the present embodiment be considered in all respects as illustrative and not restrictive, reference being made to the appended claims rather than to the foregoing description to indicate the scope of the invention.

What is claimed is:

1. An apparatus for measuring thickness of moving films comprising:

a) a sensor rotatably mounted to a carriage assembly, along an axis of rotation, said sensor having a first and second shaft aligned along said axis of rotation, said sensor including a housing having a plurality of capacitive plates orthogonal to said axis of rotation and electrically connected to said first shaft, and at least one ground plate orthogonal to said axis of rotation and electrically connected to said second shaft;

b) means for electrically contacting said first shaft and for receiving an electrical signal from said first shaft, and means for conducting said signal to a circuit which is fixed in position;

c) a conductive shield arranged about said means for electrically contacting and said shield being electrically connected to said means for conducting; whereby capacitance variations caused by relative wobble of said first shaft are electrically isolated from said carriage assembly.

2. The apparatus of claim 1, further comprising means for electrically contacting said second shaft and for receiving an electrical signal from said second shaft, and means for conducting said signal to said carriage assembly; and a conductive shield arranged about said means for electrically contacting and said shield being electrically connected to said carriage assembly.

3. The apparatus of claim 1, wherein said means for electrically contacting said first shaft further comprises a plurality of resilient conductors urged against said first shaft so as to make slidable contact with said first shaft.

4. The apparatus of claim 3, wherein said conductive shield further comprises a cover plate overlying the end of said first shaft, and an orthogonal side plate extending parallel to said axis of rotation a distance sufficient to overlay said resilient conductors.

5. The apparatus of claim 4, wherein said conductive shield further comprise a plate having an opening therethrough for passing said first shaft.

6. The apparatus of claim 5, wherein said plurality of resilient conductors are positioned between said plate having an opening therethrough, and said cover plate.

7. The apparatus of claim 6, wherein said conductive shield orthogonal side plate extends from said cover plate to said plate having an opening therethrough.

8. In a rotatable capacitance sensor having capacitive plates electrically connected to a rotatable shaft and having conductive wiper arms contacting said rotatable shaft, the improvement in electrical shielding comprising a conductive shield plate aligned orthogonal to said shaft and having an opening therethrough for the passage of said shaft; and a conductive shield cover overlaying the end of said shaft and having a portion extending parallel to said shaft to overlay said wiper arms; said shield cover and said shield plate being electrically connected to said wiper arms.

9. The apparatus of claim 8, wherein said portion extends parallel to said shaft to the position of said shield plate.

10. The apparatus of claim 9, further comprising a terminal block electrically connected to said wiper arms, said shield plate and said shield cover.

* * * * *